US005635630A

United States Patent [19]

Dawson et al.

[11] Patent Number: 5,635,630

[45] Date of Patent: Jun. 3, 1997

[54] LEAK DETECTION ASSEMBLY

[75] Inventors: Gary D. Dawson, Rochester; William B. Blomquist, Clarkston, both of Mich.; John Cook; Murray Busato, both of Chatham, Canada

[73] Assignee: Chrysler Corporation, Auburn Hills, Mich.

[21] Appl. No.: 651,095

[22] Filed: May 21, 1996

Related U.S. Application Data

[63] Continuation of Ser. No. 335,569, Nov. 8, 1994, abandoned, which is a continuation of Ser. No. 245,988, May 18, 1994, abandoned, which is a continuation of Ser. No. 61,978, May 14, 1993, abandoned, and a continuation of Ser. No. 995,484, Dec. 23, 1992, Pat. No. 5,383,437.

[51] Int. Cl.$^6$ .......... F02M 37/04; G01M 3/20

[52] U.S. Cl. .......... 73/40.5 R; 73/47; 73/118.1; 123/518; 123/520

[58] Field of Search .......... 73/40, 40.5 R, 73/117.3, 118.1, 47; 123/518, 519, 520

[56] References Cited

U.S. PATENT DOCUMENTS

| | | | |
|---|---|---|---|
| 2,552,261 | 5/1951 | Coughlin | 230/170 |
| 3,162,132 | 12/1964 | Kling | 103/50 |
| 4,794,790 | 1/1989 | Margarit-Metaxa et al. | 73/117.3 |
| 4,846,119 | 7/1989 | Geyer et al. | 123/73 C |
| 5,146,902 | 9/1992 | Cook et al. | 123/518 |
| 5,150,689 | 9/1992 | Yano et al. | 123/519 |
| 5,158,054 | 10/1992 | Otsuka | 123/198 D |
| 5,182,945 | 2/1993 | Setter | 73/118.1 |
| 5,187,973 | 2/1993 | Kunze et al. | 73/40.5 R |
| 5,191,870 | 3/1993 | Cook | 123/520 |
| 5,193,512 | 3/1993 | Steinbrenner et al. | 123/520 |
| 5,239,858 | 8/1993 | Rogers et al. | 73/40.7 |
| 5,245,973 | 9/1993 | Otsuka et al. | 123/518 |
| 5,267,470 | 12/1993 | Cook | 73/49.7 |
| 5,275,144 | 1/1994 | Gross | 123/520 |
| 5,284,050 | 2/1994 | Iida et al. | 73/118.1 |
| 5,317,909 | 6/1994 | Yamada et al. | 73/118.1 |
| 5,383,437 | 1/1995 | Cook et al. | 123/520 |
| 5,408,866 | 4/1995 | Kawamura et al. | 73/40 |
| 5,411,004 | 5/1995 | Busato et al. | 123/520 |

FOREIGN PATENT DOCUMENTS

| | | | |
|---|---|---|---|
| 2635823 | 8/1988 | France | 123/518 |
| 2681098 | 9/1991 | France | 123/518 |

*Primary Examiner*—Hezron E. Williams
*Assistant Examiner*—J. David Wiggins
*Attorney, Agent, or Firm*—Mark P. Calcaterra

[57] ABSTRACT

An assembly for testing an evaporative emission control system of an automotive vehicle which controls emission of volatile fuel vapors. The assembly is used to determine if a leak is present in a portion of the system which includes a vapor collection canister. The leak detection assembly incorporates a vacuum actuated canister vent control valve which seals the evaporative system so the leak detection test can be performed. A vacuum actuated pump which performs a leak detection test. An engine control unit initializes the pump by drawing air into a pump cavity and also closes the vent control valve. After the initialization period, the pump is activated to pressurize the evaporative emission control system. Once a control pressure is achieved, the cycle rate starts to drop off. If no leak exists in the system, the pump will eventually stop pumping. If there is a leak, the pump will continue to pump at a rate that will be representative of the flow characteristics of the size of the leak. After the test has been concluded, the vent control valve will unseal the system after the vacuum has been bled out through the orifice/check valve that has been holding the seal during the test.

29 Claims, 2 Drawing Sheets

LEAK DETECTION ASSEMBLY

This is a continuation of U.S. patent application Ser. No. 08/335,569, filed Nov. 8, 1994 which patent application became abandoned on Oct. 28, 1993, which is a continuation of U.S. patent application Ser. No. 08/245,988, filed on May 18, 1994, abandoned, which is a continuation of U.S. patent application Ser. No. 08/061,978, filed on May 14, 1993, abandoned, and is a continuation of U.S. patent application Ser. No. 07/995,484, filed on Dec. 23, 1992 which is now U.S. Pat. No. 5,383,437.

BACKGROUND OF THE INVENTION

1. Field of the Invention

The present invention relates generally to an evaporative emission control system for automotive vehicles and, more particularly, to a leak detection assembly for determining if a leak is present in a portion of the system which includes a vapor collection canister.

2. Description of the Related Art

Modern automotive vehicles typically include a fuel tank and an evaporative emission control system that collects volatile fuel vapors generated in the fuel tank. The control system includes a vapor collection canister, usually containing an activated charcoal mixture, to collect and store the emitted fuel vapors. Normally, the canister collects volatile fuel vapors which accumulate during refueling of the automotive vehicle or from increases in fuel temperature. During conditions conducive to purging, a purge valve placed between an intake manifold and the canister is opened by an engine control unit in an amount determined by the engine control unit to purge the canister; i.e., the stored vapors are drawn into the intake manifold from the canister for ultimate combustion within a combustion chamber of an engine.

Governmental regulations require that certain vehicles powered by volatile fuels such as gasoline have their evaporative emission control systems checked to determine if a leak exists in the system. On board vehicle diagnostic systems have been developed to determine if a leak is present in a portion of the evaporative emission control system. One such system utilizes a vacuum regulator/sensor unit to draw a vacuum on the control system and sense whether a loss of vacuum occurs within a specified period of time.

Diagnostic systems also exist for determining the presence of a leak in the evaporative emission control system which utilize positive pressurization rather than negative pressurization, i.e. a vacuum. In positive pressurization systems, the evaporative emission control system is pressurized to a set pressure, typically through the use of an electric air pump. A sensor determines whether the pressure remains constant over a certain amount of time.

Positive pressurization systems have a benefit over negative pressurization systems in that the increased pressure suppresses the rate of fuel vapor generation in the fuel tank. Such a situation is desirable when the test is given under hot weather conditions which typically promote fuel vapor generation.

SUMMARY OF THE INVENTION

It is, therefore, one object of the present invention to provide a leak detection assembly for use in testing the integrity of an evaporative emission control system.

It is another object of the present invention to provide a leak detection assembly which incorporates two primary functions, a vacuum actuated pump which performs leak detection and a vacuum actuated canister vent control valve which seals the evaporative emission control system so the leak detection test can be performed It is yet another object of the present invention to provide a leak detection assembly having a vacuum actuated canister vent control valve which is actuated by a vacuum actuated pump.

It is still another object of the present invention to provide a leak detection assembly having a check valve between the vacuum actuated pump and the vacuum actuated canister vent control valve to maintain the canister vent control valve in a closed, sealed position during operation of the pump.

To achieve the, foregoing objects, the present invention is a leak detection assembly for use in pressurizing and sealing an evaporative emission control system to determine if a leak is present in a portion of the system. In general, the present invention includes a vacuum actuated pump and a vacuum actuated canister vent control valve. The pump performs the leak detection function and the vent control valve seals the evaporative system so the leak detection test can be performed. A three-port solenoid activates both functions. The pump includes a switch, two check valves and a diaphragm. The vent control valve includes a valve connected to a diaphragm such that initializing the pump by drawing a vacuum in a pump actuation cavity also draws a vacuum in a vacuum chamber which closes the vent control valve and seals off the canister from an atmospheric air vent and corresponding air filter. The vent control valve remains closed while the pump is cycling due to an check valve.

The pump operates in a typical diaphragm pump fashion, i.e. energizing the solenoid creates a vacuum in the pump activation cavity which causes the diaphragm to deflect inward and draw air into the pump chamber. Once the diaphragm is fully deflected, the solenoid is de-energized allowing atmospheric pressure to enter the pump actuation cavity and permitting a spring to drive the diaphragm outward forcing air out of the pump chamber and into the system. When the diaphragm reaches the end of its stroke, a switch is closed which signals the engine control unit to activate the solenoid to start the cycle again by supplying a vacuum to the pump actuation cavity.

One advantage of the present invention is that the actuation of the pump automatically seals the evaporative emission control system so that the leak detection test can be performed. A further advantage of the present invention is that when a leak occurs, the pump will continue to pump at a rate which is representative of the flow characteristics of the size of the leak. It is also an advantage that a flow test is performed by opening a purge valve, in effect creating a leak, and checking the cycle rate of the pump to see if the corresponding increase in pump rate compares to the flow characteristics through the purge valve.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
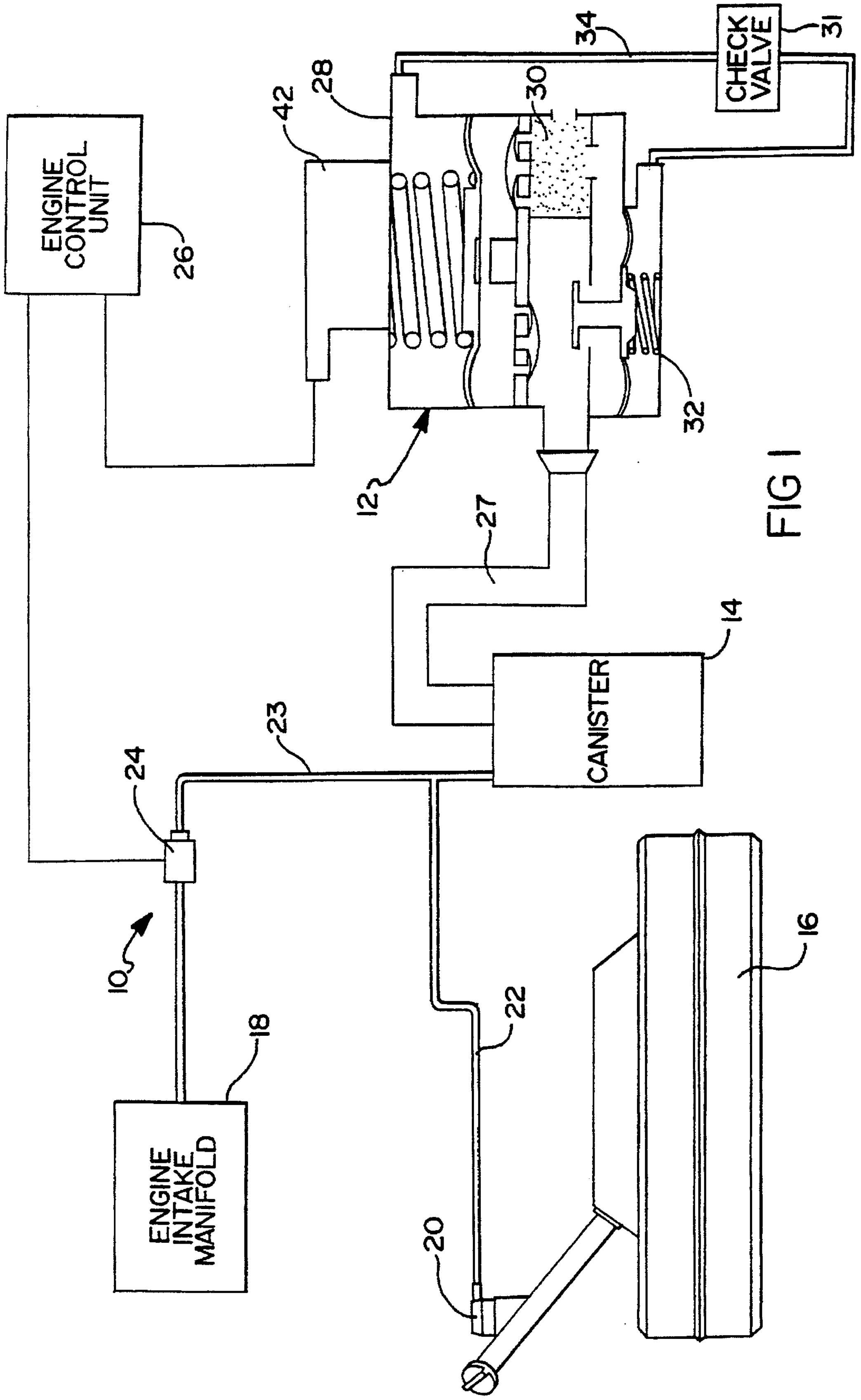
FIG. 1 is a schematic diagram of a representative evaporative emission system control utilizing a leak detection assembly, according to the present invention.

Referring to FIG. 1, an evaporative emission control system 10 is shown for an automotive vehicle (not shown)

utilizing a leak detection assembly, according to the present invention and generally indicated at 12. A carbon canister 14 is connected to the leak detection assembly 12 by a conduit 27. A fuel tank 16 is connected to the carbon canister 14 by a rollover and vapor flow control valve 20 and a conduit 22. An intake manifold 18 is connected to the canister 14 by a conduit 23 having a purge valve 24 mounted thereon. An engine control unit 26 is connected to and operative to control the leak detection assembly 12 and the purge valve 24.

A supply of volatile liquid fuel for powering an engine (not shown) of the automotive vehicle is placed in the fuel tank 16. As fuel is pumped into the fuel tank 16 or as the temperature of the fuel increases, vapors from the fuel pass through the conduit 22 and are received in the canister 14. Vapors are drawn from the canister 14 through the conduit 23 and purge valve 24, and into the intake manifold 18 for ultimate combustion within combustion chambers (not shown) of the engine. During vehicle operation, the purge valve 24 is normally closed. Under certain conditions conducive to purging, the engine control unit 26 energizes a purge solenoid (not shown) connected to the purge valve 24 to open the purge valve 24 such that a certain amount of engine intake manifold vacuum is delivered to the canister 14 causing the collected vapors to flow from the canister 14 through the purge valve 24 to the intake manifold 18 for combustion in the combustion chambers.

The leak detection assembly 12 includes a vacuum actuated pump 28 and a vacuum actuated canister vent control valve 32 coupled by a vacuum line 34. The leak detection system assembly 12 also includes a check valve 31 positioned on the vacuum line 34 to maintain the vacuum necessary to keep the vent control valve 32 in a closed position during operation of the pump 28. It should be appreciated that the vacuum actuated canister vent control valve 32 seals or closes the conduit 27 between the canister 14 and an atmospheric vent and air filter 30 in order to positively pressurize the evaporative emission control system 10.

Figure 2:
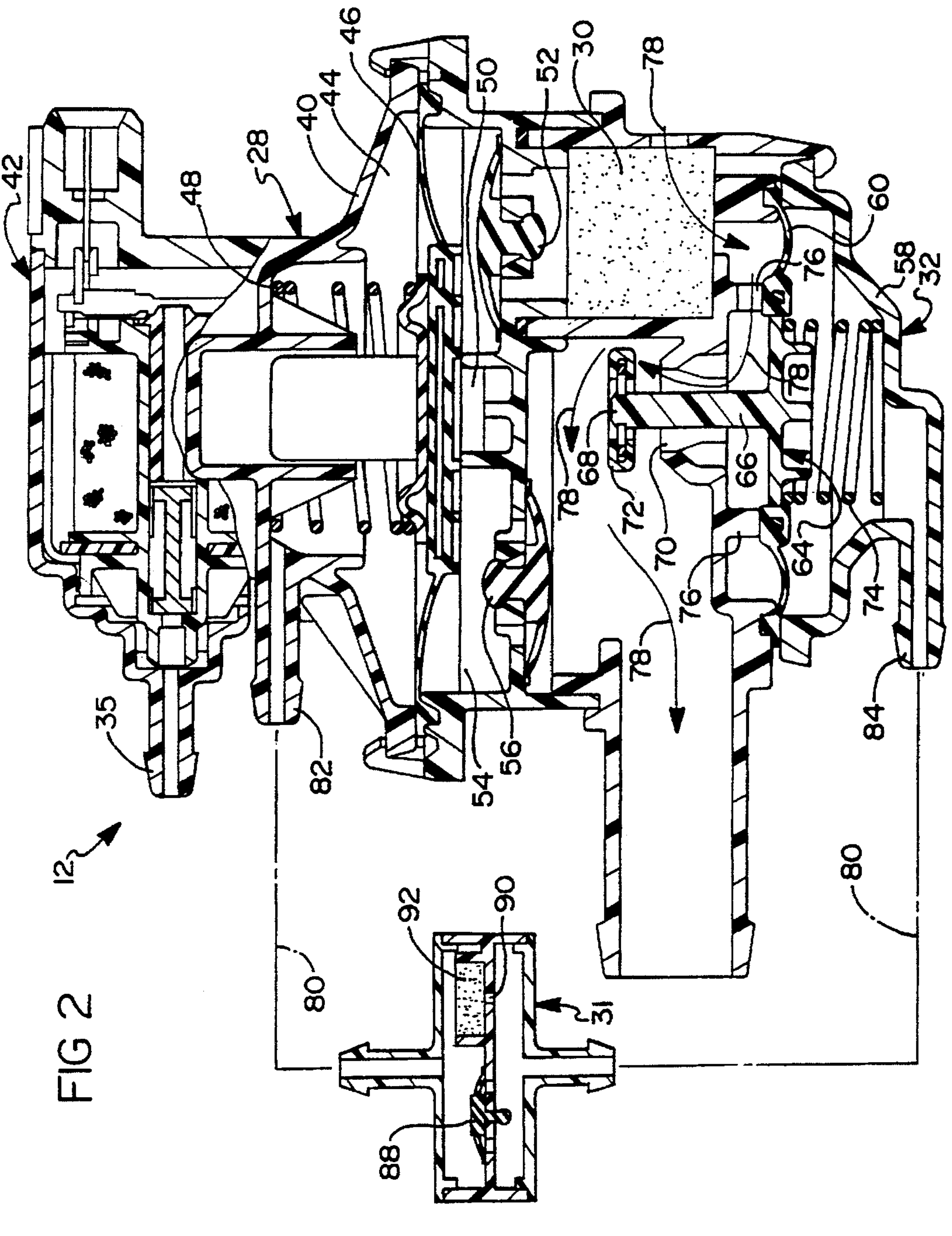
FIG. 2 is a fragmentary side view of the leak detection assembly of FIG. 1.

In accordance with the present invention, the leak detection assembly 12 is used to perform a test on the integrity of the evaporative emission control system 10. To conduct the test, the engine control unit 26 closes the purge valve 24 and actuates the vacuum actuated pump 28. The vent control valve 32 is vacuum actuated such that a vacuum drawn to activate the pump 28, results in a corresponding vacuum being drawn through a vacuum line 34 connected to the vent control valve 32 which causes the vent control valve 32 to close and seal the canister 14 from the atmospheric vent and air filter 30. Once the conduit 27 is sealed off, the pump 28 then positively pressurizes the canister 14 and tank 16 to a predetermined pressure. Once the predetermined pressure is reached, the pump 28 ceases operation. If the system 10 has a leak, the pressure is reduced and the pump 28 will sense the reduced pressure and will re-actuate. The pump 28 will continue to pump at a rate which will be representative of the flow characteristic as related to the size of the leak. From this information, it can be determined if the leak is larger or smaller than the required detection limit set by federal governmental standards. Referring now to FIG. 2, the leak detection assembly 12 includes a three-port solenoid 42. The leak detection assembly 12 further includes a housing 40. A diaphragm 46 is disposed within the housing 40 and cooperates with the housing 40 to define a pump actuation cavity 44 and a pump chamber 54. A spring 48 is disposed within the pump actuation cavity 44 and acts on the diaphragm 46. A switch 50 is mounted to the housing 40. The switch 50 is connected to the engine control unit 26. A pair of one way check valves 52, 56 are disposed in the housing 40. A vacuum line (not shown) extends from and couples the vacuum drawn by the intake manifold 18 to an inlet port 35 of the three-port solenoid 42. The three-port solenoid 42 is connected to the housing 40 and upon receiving a signal from the engine control unit 26 selectively draws and releases a vacuum in the pump actuation cavity 44. It should be appreciated that when a vacuum is drawn in the pump actuation cavity 44, the diaphragm 46 is pulled upward against the spring 48. When the vacuum is released, the diaphragm is then urged outward by the spring 48 in a pump stroke. The switch 50 is placed adjacent the diaphragm 46 such that when the diaphragm 46 reaches the end of its stroke, the switch 50 is closed. Closure of the switch 50 sends a signal to the engine control unit 26 to re-activate the solenoid 42 and re-supply a vacuum to the pump actuation cavity 44 thus starting the next cycle of all the above stated effects and mechanical actions anew.

In operation, the solenoid 42 is energized by the engine control unit 26, and connects the pump actuation cavity 44 with the vacuum drawn by the intake manifold 18 to initialize the pump 28 by drawing the diaphragm 46 upward and compressing the spring 48. Drawing the diaphragm 46 upward draws air in through the one way or check valve 52 into the pump chamber 54. The solenoid 42 is then de-energized which allows atmospheric pressure to enter the pump actuation cavity 44 whereby the spring 48 drives the diaphragm 46 outward to force the air out of the pump chamber 54 through the second one way or check valve 56 into the canister 14 and corresponding elements of the evaporative emission control system 10 through the connecting conduit 27. As the diaphragm 46 reaches the end of its stroke, the switch 50 closes. Closure of switch 50 signals the engine control unit 26 to energize the solenoid 42 and provide a vacuum to the pump actuation cavity 44. In this manner the cycle is repeated to create flow in a typical diaphragm pump fashion.

As illustrated in FIG. 2, during normal operation of the vehicle, the canister 14 is coupled to the atmospheric vent and air filter 30 through the vent control valve 32. In order to pressurize the evaporative emissions control system 10, the vent control valve 32 must be closed. The vent control valve 32 includes a housing 58. A diaphragm 60 extends across the housing 58 and in combination with the housing 58 defines a vacuum chamber 62. A valve 64 is connected to the diaphragm 60. The valve 64 includes a valve stem 66 connected to the diaphragm 60 on one end. A valve head 68 is disposed on the valve stem 66 opposite the diaphragm 60. The housing 58 further includes an opening or orifice 70 to allow communication between the canister 14 and the atmospheric vent and air filter 30. A seal element 72 is disposed about the valve head 68. The seal 72 engages and seals the orifice 70 to seal off the canister 14 from the atmospheric vent and air filter 30. A spring 74 is disposed in the vacuum chamber 62. The spring 74 acts upon the valve 64 to urge the valve 64 into an open position such that the diaphragm 60 is seated on projections 76 extending outward from the orifice 70. It should be appreciated that when the valve 64 is in an open position, air may be drawn through the atmospheric vent and air filter 30 past the open valve 64 and into the canister 14 in the direction shown by the arrows 78.

In order to pressurize the evaporative emission control system 10, the valve 64 must be closed. It should be appreciated that the valve 64 is urged closed when the solenoid 42 is initialized causing a vacuum to be drawn in the pump actuation cavity 44. When a vacuum is drawn in the pump actuation cavity 44, a corresponding vacuum is also drawn in the vacuum chamber 62 as the vacuum chamber 62 is coupled to the pump actuation chamber 44 by the vacuum line 34 connected between a port 82 on the pump actuation chamber 44 and a port 84 on the vacuum chamber 62. The vacuum drawn in the vacuum chamber 62 acts against the spring 74 to draw the valve 64 into a closed position wherein the seal element 72 engages the orifice 70.

The check valve 31 includes a one-way valve 88, an orifice 90 and a sintered filter 92 placed adjacent the orifice 90. The check valve 31 maintains the valve 64 in the closed position while the pump 28 is cycling. As illustrated in FIG. 2, when a vacuum is drawn in the pump actuation cavity 44, the check valve 31 allows the vacuum to be drawn in the vacuum chamber 62 through the one way valve 88. During cycling of the pump 28, the time constant of the bleed down through the sintered filter 92 and orifice 90 is substantially longer than the cycle rate of the pump 28, therefore while the pump 28 is operating, the vent control valve 32 remains closed.

In operation, the solenoid 42 is energized to draw a vacuum in both the pump actuation cavity 44 and the vacuum chamber 62 which seals the vent control valve 32. Once the vent control valve 32 is sealed, the solenoid 42 is cycled through periods of energizing and de-energizing causing the vacuum actuated pump 28 to pump air through the pump chamber 56 into the evaporative emission control system 10. The spring 48 in the pump actuation cavity 44 is set to a control pressure of about five inches (5") of water ($H_2O$). The cycle rate of the vacuum actuated pump 28 is quite rapid and the control pressure is quickly achieved. Once the control pressure is achieved, the cycle rate starts to drop off. If there is no leak in the system, the pump 28 will stop pumping. If a leak exists, the pump 28 will continue to pump at a rate that will be representative of the flow characteristics of the size of the leak. Since the pump rate is now known, it can be determined if the leak is larger or smaller than the required governmental leak limit.

After passing the leak detection phase of the test, a flow test is performed wherein the engine control unit 26 energizes the purge valve 24 which in effect creates a leak. The cycle rate of the pump 28 is then checked. The rate of the pump 28 should increase due to the flow through the purge valve 24. It should be appreciated that the purge valve 24 is opened to a predetermined amount which results in a specified flow characteristic, and the pump rate should correspond to the flow characteristics.

Once the diagnostic test is complete, the solenoid 42 is de-energized which allows atmospheric pressure to bleed into the pump actuation cavity 44 and correspondingly through the sintered filter 92 and orifice 90 into the vacuum chamber 62 to allow the spring 74 to open the vent control valve 32. Normal purge flow is then initiated.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. In an automotive vehicle evaporation emission control system including: a fuel tank; a canister for collecting volatile fuel vapors from the fuel tank; an atmospheric vent coupled to the canister by a conduit; an engine including a combustion chamber utilizing fuel from the fuel tank; an intake manifold connected to the engine, the intake manifold creating a vacuum during operation of the engine; a purge valve disposed between the canister and the intake manifold operative to allow flow of the fuel vapors from the canister to the intake manifold; a vacuum actuated pump attached to the conduit and in communication with the canister; the vacuum actuated pump including a housing having a diaphragm disposed within the housing defining a pump actuation cavity and a pump chamber, a spring disposed within the pump actuation cavity between the housing and the diaphragm for urging the diaphragm outward into the pump chamber in a pump stroke, a pair of one way check valves disposed in the pump chamber, the valves orientated to direct flow from the pump chamber through the conduit to the evaporative emission control system wherein the pump is used to pressurize the evaporative emission control system; and a leak detection assembly comprising:

a vent control valve operative to selectively prevent communication between the canister and the atmospheric vent coupled to the vacuum actuated pump, the vent control valve including a housing, a diaphragm disposed within the housing and defining a vacuum chamber, a valve including a head portion, a seal element connected to the head portion, the valve connected to the diaphragm, the housing further having an orifice defining a valve seat; and a vacuum line connecting the vacuum chamber to the pump actuation cavity such that a vacuum drawn in the pump actuation cavity draws a corresponding vacuum in the vacuum chamber to draw down the diaphragm which causes the seal element to engage the valve seat and closes the vent control valve, thereby defining the normally-closed position of the vent control valve set during a leak test of the evaporative emission control system.

2. A leak detection assembly as set forth in claim 1 including a check valve disposed on the vacuum line connecting the pump actuation cavity with the vacuum chamber.

3. A leak detection assembly as set forth in claim 2 wherein the check valve includes a body having a interior chamber, a plurality of ports connected to said body to allow communication with the chamber, a wall member disposed within the chamber dividing the chamber into separate portions, a one way valve member sealing an orifice in the wall member to allow fluid flow in one direction only, the wall member further including a second orifice, having a predetermined size, operative to retard fluid flow in at least one direction.

4. A leak detection assembly as set forth in claim 3 including a sintered filter placed adjacent the second orifice.

5. A leak detection assembly as set forth in claim 1 wherein the vent control valve includes a spring disposed within the vacuum chamber and acting upon the diaphragm, the spring operative to urge the diaphragm and corresponding valve outward to maintain the vent control valve in an open position when the pressure in the vacuum chamber is substantially atmospheric.

6. In an automotive vehicle evaporation emission control system including: a fuel tank; a canister for collecting volatile fuel vapors from the fuel tank; an atmospheric vent coupled to the canister by a conduit; an engine including a combustion chamber utilizing fuel from the fuel tank; an intake manifold connected to the engine, the intake manifold creating a vacuum during operation of the engine; a purge valve disposed between the canister and the intake manifold operative to allow flow of the fuel vapors from the canister to the intake manifold; a vacuum actuated pump attached to the conduit and in communication with the canister; the vacuum actuated pump including a housing having a diaphragm disposed within the housing defining a pump actuation cavity and a pump chamber, a spring disposed within the pump actuation cavity between the housing and the diaphragm for urging the diaphragm outward into the pump chamber in a pump stroke, a pair of one way check valves disposed in the pump chamber, the valves orientated to direct flow from the pump chamber through the conduit to the evaporative emission control system wherein the pump is used to pressurize the evaporative emission control system; and a leak detection assembly comprising:

a vent control valve operative to selectively prevent communication between the canister and the atmospheric vent coupled to the vacuum actuated pump, the vent control valve including a housing, a diaphragm disposed within the housing and defining a vacuum chamber, a valve including a head portion and a stem portion, the stem portion connected to the diaphragm, a seal element connected to the head portion, the housing further having an orifice defining a valve seat;

a spring disposed within the vacuum chamber and acting upon the diaphragm, the spring operative to urge the diaphragm and valve connected thereto outward to maintain the vent control valve in an open position when the pressure in the vacuum chamber is substantially atmospheric; and a vacuum line connecting the vacuum chamber to the pump actuation cavity such that a vacuum drawn in the pump actuation cavity draws a corresponding vacuum in the vacuum chamber to draw down the diaphragm which causes the seal element to engage the valve seat and closes the vent control valve, thereby defining the normally-closed position of the vent control valve set during a leak test of the evaporative emission control system.

7. A leak detection assembly as set forth in claim 6 including a check valve disposed on the vacuum line connecting the vacuum chamber with the pump actuation cavity for maintaining the vacuum in the vacuum chamber during operation of the pump.

8. A leak detection assembly as set forth in claim 7 wherein the check valve includes a body having a interior chamber, a plurality of ports connected to the body to allow communication with the chamber, a wall member disposed within the chamber dividing the chamber into separate portions, a one way valve member sealing an orifice in the wall member to allow fluid flow in one direction only, the wall member further including a second orifice, having a predetermined size operative to retard fluid flow in at least one direction.

9. A leak detection assembly as set forth in claim 8 including a sintered filter placed adjacent the second orifice.

10. In an automotive vehicle evaporation emission control system including: a fuel tank; a canister for collecting volatile fuel vapors from the fuel tank; an atmospheric vent coupled to the canister by a conduit; an engine including a combustion chamber utilizing fuel from the fuel tank; an intake manifold connected to the engine, the intake manifold creating a vacuum during operation of the engine; a purge valve disposed between the canister and the intake manifold operative to allow flow of the fuel vapors from the canister to the intake manifold; a vacuum actuated pump attached to the conduit and in communication with the canister; the vacuum actuated pump including a housing having a diaphragm disposed within the housing defining a pump actuation cavity and a pump chamber, a spring disposed within the pump actuation cavity between the housing and the diaphragm for urging the diaphragm outward into the pump chamber in a pump stroke, a pair of one way check valves disposed in the pump chamber, the valves orientated to direct flow from the pump chamber through the conduit to the evaporative emission control system wherein the pump is used to pressurize the evaporative emission control system; and a leak detection assembly comprising:

a vent control valve coupled with the vacuum actuated pump for selectively sealing off the conduit and preventing communication between the canister and the atmospheric vent, the vent control valve including a housing, a diaphragm disposed within the housing and defining a vacuum chamber, a valve including a head portion and a stem portion, the stem portion connected to the diaphragm, a seal element connected to the head portion, the housing further having an orifice defining a valve seat;

a spring disposed within the vacuum chamber and acting upon the diaphragm, the spring operative to urge the diaphragm and valve connected thereto outward to maintain the vent control valve in an open position when the pressure in the vacuum chamber is substantially atmospheric;

a vacuum line connecting the vacuum chamber to the pump actuation cavity such that a vacuum drawn in the pump actuation cavity draws a corresponding vacuum in the vacuum chamber to draw down the diaphragm which causes the seal element to engage the valve seat to close the vent control valve, thereby defining the normally-closed position of the vent control valve set during a leak test of the evaporative emission control system; and a check valve including a body having an interior chamber, a plurality of ports connected to said body to allow communication with the chamber, a wall member disposed within the chamber dividing the chamber into separate portions, a one way valve member sealing an orifice in the wall member to allow fluid flow in one direction only, the wall member further including a second orifice, having a predetermined size, operative to retard fluid flow in at least one direction.

11. A leak detection assembly for an evaporative emission control system in an automotive vehicle including a fuel tank, a canister for collecting volatile fuel vapors from the fuel tank, an intake manifold connected to an engine of the automotive vehicle to create a vacuum during operation of the engine and a purge valve disposed between the canister and the intake manifold operative to allow flow of the fuel vapors from the canister to the intake manifold, said leak detection assembly comprising:

a vacuum actuated pump in communication with the canister;

a vacuum actuated canister vent control valve operative to selectively allow and prevent communication between the canister and said vacuum actuated pump; and means interconnecting said vacuum actuated pump and said vacuum actuated vent control valve.

12. A leak detection assembly as set forth in claim 11 wherein said vacuum actuated vent control valve comprises a housing, a diaphragm disposed within said housing to define a vacuum chamber, and a valve connected to said diaphragm to close said vacuum actuated vent control valve during a leak detection assembly test of the evaporative emission control system.

13. A leak detection assembly as set forth in claim 12 including a spring disposed within said vacuum chamber to urge said diaphragm and said valve outward to maintain said vacuum actuated vent control valve in an open position when the pressure in said vacuum chamber is substantially atmospheric.

14. A leak detection assembly as set forth in claim 12 wherein said housing has an orifice defining a valve seat.

15. A leak detection assembly as set forth in claim 14 wherein said valve has a head portion and a seal element connected to said head portion to engage said valve seat.

16. A leak detection assembly for an evaporative emission control system in an automotive vehicle including a fuel tank, a canister for collecting volatile fuel vapors from the fuel tank, an intake manifold connected to an engine of the automotive vehicle to create a vacuum during operation of the engine and a purge valve disposed between the canister and the intake manifold operative to allow flow of the fuel vapors from the canister to the intake manifold, said leak detection assembly comprising:

a pump in communication with the canister;

a vacuum actuated canister vent control valve operative to selectively allow and prevent communication between the canister and said pump;

wherein said vacuum actuated vent control valve is integrally associated with said pump by being disposed to selectively open and close a passage extending between an inlet port of said pump and an outlet port of said pump.

17. A leak detection assembly for an evaporative emission control system in an automotive vehicle including a fuel tank, a canister for collecting volatile fuel vapors from the fuel tank, an intake manifold connected to an engine of the automotive vehicle to create a vacuum during operation of the engine and a purge valve disposed between the canister and the intake manifold operative to allow flow of the fuel vapors from the canister to the intake manifold, said leak detection assembly comprising:

a vacuum actuated pump in communication with the canister;

a vacuum actuated canister vent control valve operative to selectively allow and prevent communication between the canister and said vacuum actuated pump;

a vacuum line interconnecting said vacuum actuated pump and said vacuum actuated vent control valve; and a check valve disposed on said vacuum line to allow one way fluid flow to maintain a vacuum to keep said valve in a closed position during operation of said vacuum actuated pump.

18. A leak detection assembly for an evaporative emission control system in an automotive vehicle including a fuel tank, a canister for collecting volatile fuel vapors from the fuel tank, an intake manifold connected to an engine of the automotive vehicle to create a vacuum during operation of the engine and a purge valve disposed between the canister and the intake manifold operative to allow flow of the fuel vapors from the canister to the intake manifold, said leak detection assembly comprising:

a pump in communication with the canister;

a vacuum actuated canister vent control valve operative to selectively allow and prevent communication between the canister and said pump;

a vacuum line interconnecting said pump and said vacuum actuated vent control valve;

a check valve disposed on said vacuum line to allow one way fluid flow to maintain a vacuum to keep said valve in a closed position during operation of said pump; and wherein said check valve includes a body having an interior chamber, a plurality of ports connected to said body to allow communication with said interior chamber, a wall member disposed within said interior chamber and dividing said interior chamber into separate portions, a one way valve member sealing an orifice in said wall member to allow fluid flow in one direction only, said wall member further including a second orifice having a predetermined size and operative to retard fluid flow in at least one direction.

19. A leak detection assembly as set forth in claim 18 including a sintered filter placed adjacent said second orifice.

20. A leak detection assembly for an evaporative emission control system in an automotive vehicle including a fuel tank, a canister for collecting volatile fuel vapors from the fuel tank, an intake manifold connected to an engine of the automotive vehicle to create a vacuum during operation of the engine and a purge valve disposed between the canister and the intake manifold operative to allow flow of the fuel vapors from the canister to the intake manifold, said leak detection assembly comprising:

a pump in communication with the canister;

a vacuum actuated vent control valve operative to selectively allow and prevent communication between the canister and said pump;

a line interconnecting said pump and said vacuum actuated vent control valve; and a check valve disposed on said line to allow one way fluid flow to maintain a vacuum to keep said vacuum actuated vent control valve in a closed position during operation of said pump.

21. A leak detection assembly as set forth in claim 20 wherein said vacuum actuated vent control valve comprises a housing, a diaphragm disposed within said housing to define a vacuum chamber, and a valve connected to said diaphragm to close said vacuum actuated vent control valve.

22. A leak detection assembly as set forth in claim 21 wherein said housing has an orifice defining a valve seal.

23. A leak detection assembly as set forth in claim 22 wherein said valve has a head portion and a seal element connected to said head portion to engage said valve seat.

24. A leak detection assembly as set forth in claim 23 including a spring disposed within said vacuum chamber to urge said diaphragm and said valve outward to maintain said vacuum actuated vent control valve in an open position when the pressure in said vacuum chamber is substantially atmospheric.

25. A leak detection assembly as set forth in claim 20 wherein said check valve includes a body having an interior chamber, a plurality of ports connected to said body to allow communication with said interior chamber, a wall member disposed within said interior chamber and dividing said interior chamber into separate portions, a one way valve member sealing an orifice in said wall member to allow fluid flow in one direction only, said wall member further including a second orifice, having a predetermined size, operative to retard fluid flow in at least one direction.

26. An automotive vehicle comprising an internal combustion engine and a fuel system for said engine which comprises a fuel tank for storing volatile liquid fuel for the engine and an evaporative emission control system which comprises a collection canister that in cooperative combination with head space of said tank cooperatively defines an evaporative emission space wherein fuel vapors generated from the volatilization of fuel in said tank are temporarily confined and collected until periodically purged by means of a canister purge valve to an intake manifold of the engine for entrainment with induction flow of combustible mixture into combustion chamber space of the engine and ensuing combustion in said combustion chamber space, valve means via which said evaporative emission space is selectively communicated to atmosphere, said vehicle further comprising means, including pump means, for distinguishing between integrity and non-integrity of said evaporative emission control system, under conditions conducive to obtaining a reliable distinction between such integrity and non-integrity, against leakage of volatile fuel vapor from that portion thereof which includes said tank, said canister, said valve means, and said canister purge valve, characterized in that said pump means comprises a positive displacement reciprocating pump having a mechanism that, while said valve means is closed to prevent communication of said evaporative emission space to atmosphere and while said canister purge valve is closed to prevent communication of said evaporative emission space to said intake manifold, executes reciprocating motion comprising an intake stroke and a compression stroke and that comprises means to intake air during each occurrence of the intake stroke for creating a measured charge volume of air at given pressure and means to compress said measured charge volume of air to pressure greater than such given pressure and force a portion thereof into said evaporative emission space on each occurrence of the compression stroke, and characterized further in that said positive displacement reciprocating pump comprises a housing that is divided by a movable wall into an air pumping chamber space and a vacuum chamber space, a one-way valve through which said inlet port communicates with said air pumping chamber space such that air can enter, but not exit, said air pumping chamber space via said inlet port, a second one-way valve through which said outlet port communicates with said air pumping chamber space such that air can exit, but not enter, said air pumping chamber space via said outlet port, said pump further comprising a mechanical spring that acts on said movable wall in a sense urging said movable wall to compress air in said air pumping chamber space, means for repeatedly causing said vacuum chamber space to be alternately communicated to intake manifold vacuum and to atmosphere such that during communication of said vacuum chamber space to intake manifold vacuum, said movable wall executes an intake stroke against force exerted thereon by said mechanical spring to draw air from atmosphere into said air pumping chamber space through said inlet port and first one-way valve, and during communication of said vacuum chamber space to atmosphere, said mechanical spring forces said movable wall to execute a compression stroke to force some of the air from said air pumping chamber space through said second one-way valve and said outlet port into said evaporative emission space, and said vacuum chamber space is in communications with a vacuum actuator for operating said vent control valve such that when vacuum is delivered to said vacuum chamber space, it is also conveyed to said vacuum actuator to cause said vent control valve to close, thereby defining the normally-closed position of said vent control valve set during a leak test of the evaporative emission control system.

27. An automotive vehicle as set forth in claim 26 characterized further in that vacuum is conducted to said vacuum actuator via the parallel combination of an orifice and a third one-way valve organized and arranged such that said third one-way valve organized and arranged such that said third one-way valve allows vacuum to pass into, but not from, said vacuum actuator whereby vacuum is promptly conveyed to said vacuum actuator when said vacuum chamber space is communicated to vacuum, but is delayed in leaving said vacuum actuator when said vacuum chamber space is communicated to atmosphere.

28. An automotive vehicle comprising an internal combustion engine and a fuel system for said engine which comprises a fuel tank for storing volatile liquid fuel for the engine and an evaporative emission control system which comprises a collection canister that in cooperative combination with head space of said tank cooperatively defines an evaporative emission space wherein fuel vapors generated from the volatilization of fuel in said tank are temporarily confined and collected until periodically purged by means of a canister purge valve to an intake manifold of the engine for entrainment with induction flow of combustible mixture into combustion chamber space of the engine and ensuing combustion in said combustion chamber space, valve means via which said evaporative emission space is selectively communicated to atmosphere, said vehicle further comprising means, including pump means, for distinguishing between integrity and non-integrity of said evaporative emission control system, under conditions conducive to obtaining a reliable distinction between such integrity and non-integrity, against leakage of volatile fuel vapor from that portion thereof which includes said tank, said canister, said valve means, and said canister purge valve, characterized in that said pump means comprises a positive displacement reciprocating pump having a mechanism that, while said valve means is closed to prevent communication of said evaporative emission space to atmosphere and while said canister purge valve is closed to prevent communication of said evaporative emission space to said intake manifold, executes reciprocating motion comprising an intake stroke and a compression stroke and that comprises means to intake air during each occurrence of the intake stroke for creating a measured charge volume of air at given pressure and means to compress said measured charge volume of air to pressure greater than such given pressure and force a portion thereof into said evaporative emission space on each occurrence of the compression stroke, and further in that said positive displacement reciprocating pump comprises a housing that is divided by a movable wall into an air pumping chamber space and a vacuum chamber space, inlet means including a one-way valve communicating an inlet of said air pumping chamber space to atmosphere such that air can enter, but not exit, said air pumping chamber space via said inlet means, outlet means including a second one-way valve communicating an outlet of said air pumping chamber space to said evaporative emission space such that air can exit, but not enter said air pumping chamber space via said outlet means, and said valve means comprises a vent valve having a vent valve inlet in fluid communication with said outlet means at a location between said evaporative emission space and the one-way valve of said outlet means and a vent valve outlet in fluid communication with said inlet means at a location between atmosphere and the one-way valve of said inlet means; characterized further in that said pump further comprises a mechanical spring that acts on said movable wall in a sense during said movable wall to compress air in said air pumping chamber space, sand means for repeatedly causing said vacuum and to atmosphere such that during communication of said vacuum chamber space to intake manifold vacuum, said movable wall executes an intake stroke against force exerted thereon by said mechanical spring to draw air from atmosphere into said air pumping chamber space through said inlet means, and during communication of said vacuum chamber space to atmosphere, said mechanical spring forces said movable wall to execute a compression stroke to force some of the air from said air pumping chamber space through said outlet means into said evaporative emission space, spring means resiliently biasing said vent valve open, and vacuum actuator means including a check valve and an orifice fluidly connected in parallel with each other between said vacuum chamber space and a vacuum actuator of said vacuum actuator means such that when vacuum is applied to said vacuum chamber space, it is concurrently applied to said vacuum actuator to cause said vent valve to immediately close, and to cause vacuum sufficient to keep said vent valve closed to continue to be applied to said vacuum actuator for a certain amount of time after vacuum ceases to be applied to said vacuum chamber space, thereby defining the normally-closed position of said vent control valve set during a leak test of the evaporative emission control system.

29. An automotive vehicle comprising an internal combustion engine and a fuel system for said engine which comprises a fuel tank for storing volatile liquid fuel for the engine and an evaporative emission control system which comprises a collection canister that in cooperative combination with head space of said tank cooperatively defines an evaporative emission space wherein fuel vapors generated from the volatilization of fuel in said tank are temporarily confined and collected until periodically purged by means of a canister purge valve to an intake manifold of the engine for entrainment with induction flow of combustible mixture into combustion chamber space of the engine and ensuing combustion in said combustion chamber space, valve means via which said evaporative emission space is selectively communicated to atmosphere, said vehicle further comprising means, including pump means, for distinguishing between integrity and non-integrity of said evaporative emission control system, under conditions conducive to obtaining a reliable distinction between such integrity and non-integrity, against leakage of volatile fuel vapor from that portion thereof which includes said tank, said canister, said valve means, and said canister purge valve, characterized in that said pump means comprises a positive displacement reciprocating pump having a mechanism that, while said valve means is closed to prevent communication of said evaporative emission space to atmosphere and while said canister purge valve is closed to prevent communication of said evaporative emission space to said intake manifold, executes reciprocating motion comprising an intake stroke and a compression stroke and that comprises means to intake air during each occurrence of the intake stroke for creating a measured charge volume of air at given pressure and means to compress said measured charge volume of air to pressure greater than such given pressure and force a portion thereof into said evaporative emission space on each occurrence of the compression stroke, and characterized further in that said positive displacement reciprocating pump comprises a housing that is divided by a movable wall into an air pumping chamber space and a vacuum chamber space, inlet means including a one-way valve communicating an inlet of said air pumping chamber space to atmosphere such that air can enter, but not exit, said air pumping chamber space via said inlet means, outlet means including a second one-way valve communicating an outlet of said air pumping chamber space to said evaporative emission space such that air can exit, but not enter, said air pumping chamber space via said outlet means, and said valve means comprises a vacuum actuated vent valve having a vent valve inlet in fluid communication with said outlet means at a location between said evaporative emission space and the one-way valve of said outlet means and a vent valve outlet in fluid communication with said inlet means at a location between atmosphere and the one-way valve of said inlet means.

* * * * *